(12) United States Patent
Durance et al.

(10) Patent No.: US 10,178,873 B2
(45) Date of Patent: Jan. 15, 2019

(54) APPARATUS AND METHOD FOR MICROWAVE VACUUM-DRYING OF ORGANIC MATERIALS

(75) Inventors: Timothy D. Durance, Vancouver (CA); Jun Fu, Port Coquitlam (CA); Parastoo Yaghmaee, Vancouver (CA)

(73) Assignee: EnWave Corporation, Vancouver (CA)

( * ) Notice: Subject to any disclaimer, the term of this patent is extended or adjusted under 35 U.S.C. 154(b) by 316 days.

(21) Appl. No.: 12/682,989

(22) PCT Filed: Oct. 15, 2008

(86) PCT No.: PCT/CA2008/001811
§ 371 (c)(1),
(2), (4) Date: May 5, 2010

(87) PCT Pub. No.: WO2009/049409
PCT Pub. Date: Apr. 23, 2009

(65) Prior Publication Data
US 2010/0218395 A1    Sep. 2, 2010

Related U.S. Application Data

(60) Provisional application No. 60/980,070, filed on Oct. 15, 2007.

(51) Int. Cl.
*F26B 3/347*    (2006.01)
*F26B 13/30*    (2006.01)
(Continued)

(52) U.S. Cl.
CPC    *A23L 3/01* (2013.01); *A23B 7/01* (2013.01); *A23B 7/02* (2013.01); *A23B 7/148* (2013.01);
(Continued)

(58) Field of Classification Search
CPC .......... F26B 3/347; F26B 15/04; F26B 23/04; F26B 25/001; F26B 25/003; F26B 25/008;
(Continued)

(56) References Cited

U.S. PATENT DOCUMENTS 1,969,101 A * 8/1934 Semon .......................... 264/308
2,900,477 A     8/1959 Bottonair
(Continued)

FOREIGN PATENT DOCUMENTS

CA    1 158 432 A    12/1983
CA    2 354 300 A1    1/2003
(Continued)

OTHER PUBLICATIONS

Supplemental European Search Report, Enwave Corporation et al., EP 08 83 8608, dated Oct. 22, 2010, 1 pages.
(Continued)

*Primary Examiner* — Jessica Yuen
(74) *Attorney, Agent, or Firm* — McKee, Voorhees & Sease, PLC

(57) ABSTRACT

An apparatus and method for microwave vacuum-drying of organic materials, such as food products. The apparatus has a microwave vacuum chamber 20, a loading module 36 to load containers 38 of the organic material into the vacuum chamber, a rotatable cylindrical cage 64 in the vacuum chamber for rotating the containers, a piston 114 for moving the rotating containers through the vacuum chamber, and means for unloading the containers of dehydrated material from the vacuum chamber. The apparatus may include an equilibration chamber 150 for cooling the dehydrated material under reduced pressure, and a transfer module 42 to transfer the containers from the vacuum chamber to the equilibration chamber. The apparatus has a microwave
(Continued)

transparent window 54 for transmission of radiation into the vacuum chamber, and a gas jet 58, 60, 62 for blowing a stream of gas, such as air or nitrogen, into the vacuum chamber adjacent to the window.

37 Claims, 9 Drawing Sheets

(51) Int. Cl.

| | | |
|---|---|---|
| *F26B 5/04* | (2006.01) | |
| *A23L 3/01* | (2006.01) | |
| *A23B 7/01* | (2006.01) | |
| *A23B 7/02* | (2006.01) | |
| *A23B 7/148* | (2006.01) | |
| *A23L 3/3418* | (2006.01) | |
| *A23L 3/54* | (2006.01) | |
| *F26B 15/14* | (2006.01) | |
| *F26B 17/30* | (2006.01) | |

(52) U.S. Cl.
CPC ............. *A23L 3/3418* (2013.01); *A23L 3/54* (2013.01); *F26B 3/347* (2013.01); *F26B 5/042* (2013.01); *F26B 15/143* (2013.01); *F26B 17/30* (2013.01)

(58) Field of Classification Search
CPC ........ F26B 25/04; F26B 25/063; F26B 5/042; F26B 15/143; F26B 17/30; A23L 3/01; A23L 3/3418; A23L 3/54; A23B 7/01; A23B 7/02; A23B 7/148
USPC ... 34/265, 92, 406, 259, 261, 263, 264, 403, 34/412, 206, 209
See application file for complete search history.

(56) References Cited

U.S. PATENT DOCUMENTS

| | | | | |
|---|---|---|---|---|
| 3,174,229 | A | * | 3/1965 | Stokes et al. .................... 34/92 |
| 3,308,332 | A | * | 3/1967 | Bibb .................................. 315/5 |
| 4,033,048 | A | | 7/1977 | Van Ike |
| 4,045,639 | A | | 8/1977 | Meisel |
| 4,169,408 | A | * | 10/1979 | Mencacci ....................... 99/355 |
| 4,329,554 | A | | 5/1982 | Huber et al. |
| 4,347,670 | A | | 9/1982 | Wear et al. |
| 4,389,794 | A | | 6/1983 | Bitterly |
| 4,664,924 | A | | 5/1987 | Sugisawa et al. |
| 4,809,596 | A | | 3/1989 | Akutsu et al. |
| 4,882,851 | A | | 11/1989 | Wennerstrum et al. |
| 5,020,237 | A | | 6/1991 | Gross et al. |
| 5,211,808 | A | | 5/1993 | Vilardi et al. |
| 5,334,402 | A | | 8/1994 | Ovadia |
| 5,388,345 | A | | 2/1995 | Brundage et al. |
| 5,672,370 | A | | 9/1997 | Durance et al. |
| 5,676,989 | A | * | 10/1997 | Durance et al. ............. 426/242 |
| 5,956,865 | A | | 9/1999 | Durance et al. |
| 5,962,057 | A | | 10/1999 | Durance et al. |
| 5,980,962 | A | | 11/1999 | Bracken et al. |
| 6,128,831 | A | | 10/2000 | Durance et al. |
| 6,442,866 | B2 | * | 9/2002 | Wefers ........................... 34/263 |
| 7,092,668 | B2 | * | 8/2006 | Behnke et al. ............... 399/336 |
| 2005/0019209 | A1 | * | 1/2005 | Burger et al. ................... 422/23 |
| 2006/0286234 | A1 | | 12/2006 | Tsai et al. |
| 2008/0181994 | A1 | | 7/2008 | Cornwell et al. |

FOREIGN PATENT DOCUMENTS

| | | |
|---|---|---|
| CA | 2 557 628 A1 | 2/2008 |
| CN | 2713823 Y | 3/2005 |
| CN | 2 870 478 Y | 2/2007 |
| DE | 3916479 C1 | 8/1990 |
| JP | 62143674 A | 6/1987 |
| JP | 63076439 A | 4/1988 |
| JP | 4023995 B | 4/1992 |
| JP | 5056760 A | 3/1993 |
| JP | 8016586 B | 2/1996 |
| JP | 2000274941 A | 10/2000 |
| JP | 2000513926 A | 10/2000 |
| JP | 2001330369 A | 11/2001 |
| JP | 2007024379 A | 2/2007 |
| JP | 4207168 B2 | 1/2009 |
| WO | WO 03/103407 A1 | 12/2003 |

OTHER PUBLICATIONS

International Search Report, Enwave Corporation et al., PCT/CA2008/001811, Search dated Feb. 16, 2009, 6 pages.
Corrected International Preliminary Report on Patentability, Enwave Corporation et al., PCT/CA2008/001811, Search dated Oct. 13, 2009, 10 pages.
JP62143674, Tokuda Seisakusho House Food Industrial—English Abstract Translation.
JP63076439, Hitachi—English Abstract Translation.
JP4023995, Panasonic—English Abstract Translation.
JP5056760, Asahi—English Abstract Translation.
JP8016586, Kiyoutofu Chiya Kiyoudoukumiai—English Abstract Translation.
JP2000274941, Morita Econos—English Abstract Translation.
JP2000513926—English Abstract Translation.
JP2001330369, Mistubishi Heavy Industries—English Abstract Translation.
JP2007024379, Otsuki Hiroshi—English Abstract Translation.
JP4207168, Aoyama Yoshitaka—English Abstract Translation.
Enwave Corporation, EP 10769180.0, "Supplemental European Search Report" dated Jul. 15, 2014.
DE 3916479—Moebus, Otto, Dr. Rer. Nat.—English Translation.
Kaensup, Weerachai, et al, "Experimental Study on Drying of Chilli in a Combined Microwave-Vacuum-Rotary Drum Dryer," Drying Technology, 2002, vol. 20, No. 10, pp. 2067-2079.
Sundaram, J., et al, "Influence of Processing Methods on Mechanical and Structural Characteristics of Vacuum Microwave Dried Biopolymer Foams," Trans IChemE, Part C, Food and Bioproducts Processing, 2007, 85(C3): 264-72.

\* cited by examiner

APPARATUS AND METHOD FOR MICROWAVE VACUUM-DRYING OF ORGANIC MATERIALS

CROSS-REFERENCE TO RELATED APPLICATIONS

This is a National Phase application claiming priority to PCT/CA2008/001811 filed Oct. 15, 2008 which claims priority under 35 U.S.C. § 119 to provisional application U.S. Ser. No. 60/980,070 filed Oct. 15, 2007, and which applications are hereby incorporated by reference in their entirety.

FIELD OF THE INVENTION

The invention pertains to apparatuses and methods for microwave vacuum-drying of organic materials, such as food products and medicinal plants.

BACKGROUND OF THE INVENTION

Dehydration of organic materials is common in the food processing and the medicinal herb industry. It may be done in order to preserve the products for storage, for example fruits and vegetables, the dehydrated products being later rehydrated for consumption. Dehydration may also be done to create a product that is used in the dehydrated form, for example dried herbs and various kinds of chips. Conventional methods of dehydrating such materials include air-drying and freeze-drying. Both of these drying methods have their limitations. In general terms, air-drying is slow and freeze-drying is expensive, and both methods tend to degrade the appearance and texture of the products.

It is also known in the art to dehydrate foods and plant materials by microwave vacuum dehydration. Examples of this in the patent literature include: U.S. Pat. No. 4,664,924 Sugisawa et al.; U.S. Pat. No. 6,128,831 Durance et al.; U.S. Pat. No. 5,956,865 Durance et al.; U.S. Pat. No. 4,389,794 Bitterly; U.S. Pat. No. 4,809,596 Akutsu et al.; U.S. Pat. No. 4,882,851 Wennerstrum et al.; and WO 021103407 A1 Radas et al. Microwave vacuum-drying is a rapid method that can yield products with improved quality compared to air-dried and freeze-dried products. Because the drying is done under reduced pressure, the boiling point of water and the oxygen content of the atmosphere is lowered, so food or medicinal components sensitive to oxidation and thermal degradation can be retained to a higher degree than by air-drying. The drying process is also much faster than air- and freeze-drying. The present invention is directed to improvements in the art of microwave vacuum-drying.

SUMMARY OF THE INVENTION

According to one aspect of the invention, there is provided an apparatus for dehydrating organic material. A vacuum chamber has an input end for the introduction of a container of the material to be dehydrated and a discharge end for removal of the container of dehydrated material. The apparatus has a microwave generator and a microwave-transparent window for transmission of microwave radiation from the generator into the vacuum chamber. It includes means for reducing pressure inside the vacuum chamber, means for loading the container of organic material into the input end, means for rotating the container inside the vacuum chamber, means for moving the rotating container from the input end to the discharge end, and means for unloading the container of dehydrated material from the vacuum chamber at the discharge end. The apparatus may optionally include means for cooling the dehydrated organic material at a pressure less than atmospheric.

According to another aspect of the invention, there is provided an apparatus for dehydrating organic material, the apparatus comprising a vacuum chamber, a microwave generator and a microwave-transparent window for transmission of microwave radiation from the generator into the vacuum chamber, and means for blowing a stream of air or other gas into the vacuum chamber adjacent to the window. This aspect of the invention is directed to reducing the arcing of microwave radiation that occurs in microwave vacuum-dehydrators. Such arcing can destroy the microwave-transparent windows of the vacuum chamber and cause burning of the products being dehydrated. The present inventors have discovered that blowing a stream of gas adjacent to the inside of the microwave-transparent windows, inside the vacuum chamber, reduces arcing during operation of a microwave-vacuum apparatus. It is believed that this is due, first, to the creation of a pressure gradient between the window and the interior of the vacuum chamber, and second, to the prevention of condensation of water and other volatile materials on the inside of the window.

According to another aspect of the invention, there is provided a method for dehydrating an organic material. A microwave-transparent container holding the organic material to be dehydrated is provided. The container is introduced into a vacuum chamber, the chamber being at a pressure less than atmospheric. The container is rotated inside the vacuum chamber and the rotating container is moved through the vacuum chamber while applying microwave radiation to dehydrate the organic materials. The container of dehydrated organic material is then removed from the vacuum chamber. The method may optionally include the step, after removal of the dehydrated organic material from the vacuum chamber, of cooling the material at a pressure less than atmospheric.

According to a further aspect of the invention, there is provided a method for dehydrating an organic material. A vacuum chamber is evacuated, i.e. brought to a pressure that is less than atmospheric. Microwave radiation is transmitted into the vacuum chamber through a microwave-transparent window. A stream of gas, for example air, nitrogen or helium, is blown into the vacuum chamber adjacent to the window. The organic material to be dehydrated is introduced into the vacuum chamber and allowed to be dehydrated. The dehydrated material is then removed from the vacuum chamber.

Organic materials that may be dehydrated using the apparatuses and methods of the invention include food products such as fruits, berries (e.g. blueberries, cranberries, strawberries), vegetables, chips (e.g. apple, potato, banana, tortilla), herbs, meats, nutraceuticals, seeds, flowers and other plant materials such as roots, tubers, stems, leaves, etc.

These and other features of the invention will be apparent from the following description and drawings of the preferred embodiments.

DESCRIPTION OF THE PREFERRED EMBODIMENTS

The Dehydrating Apparatus

Figure 1:
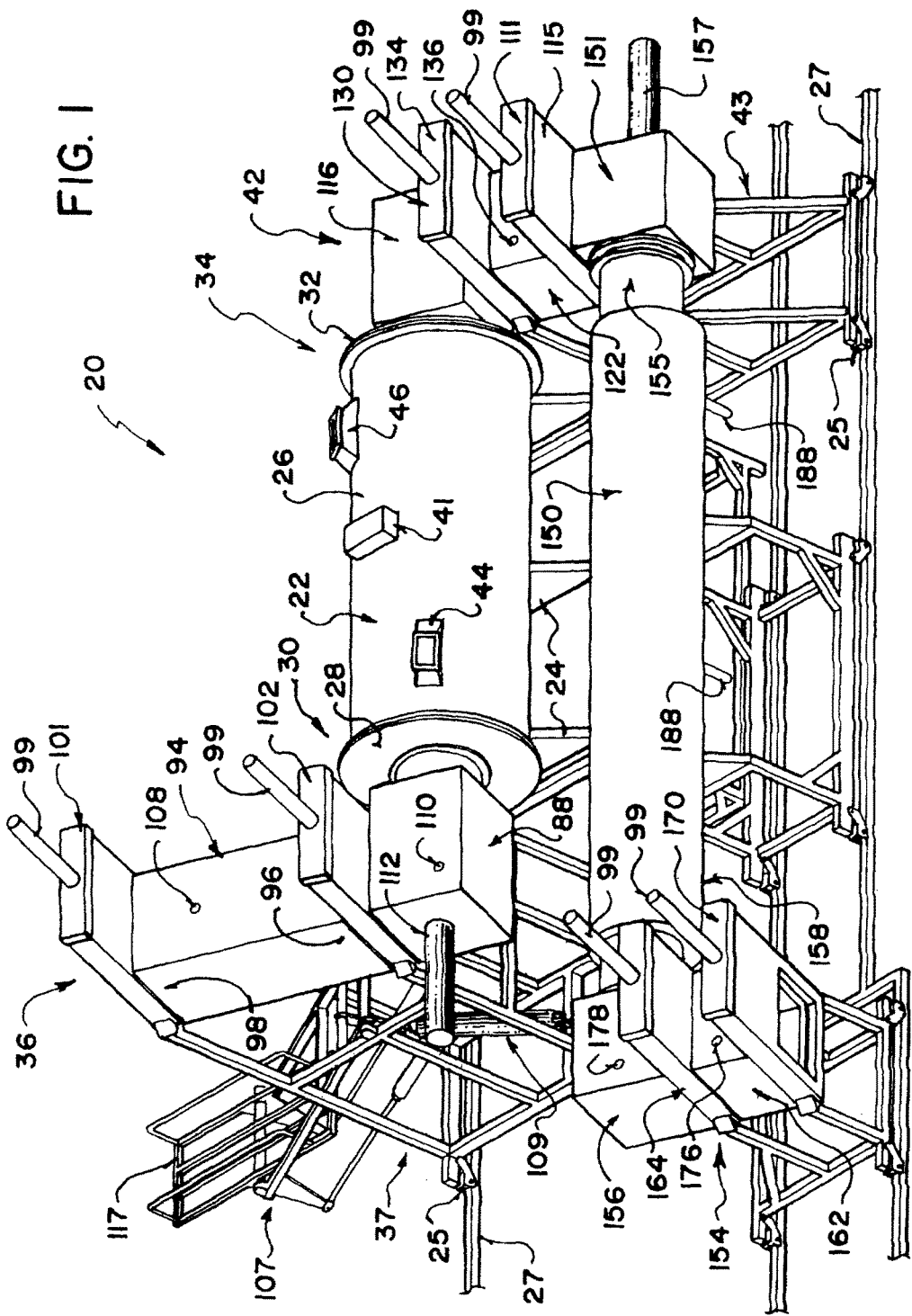
FIG. 1 is an isometric view of an apparatus according to one embodiment of the invention.
Figure 2:
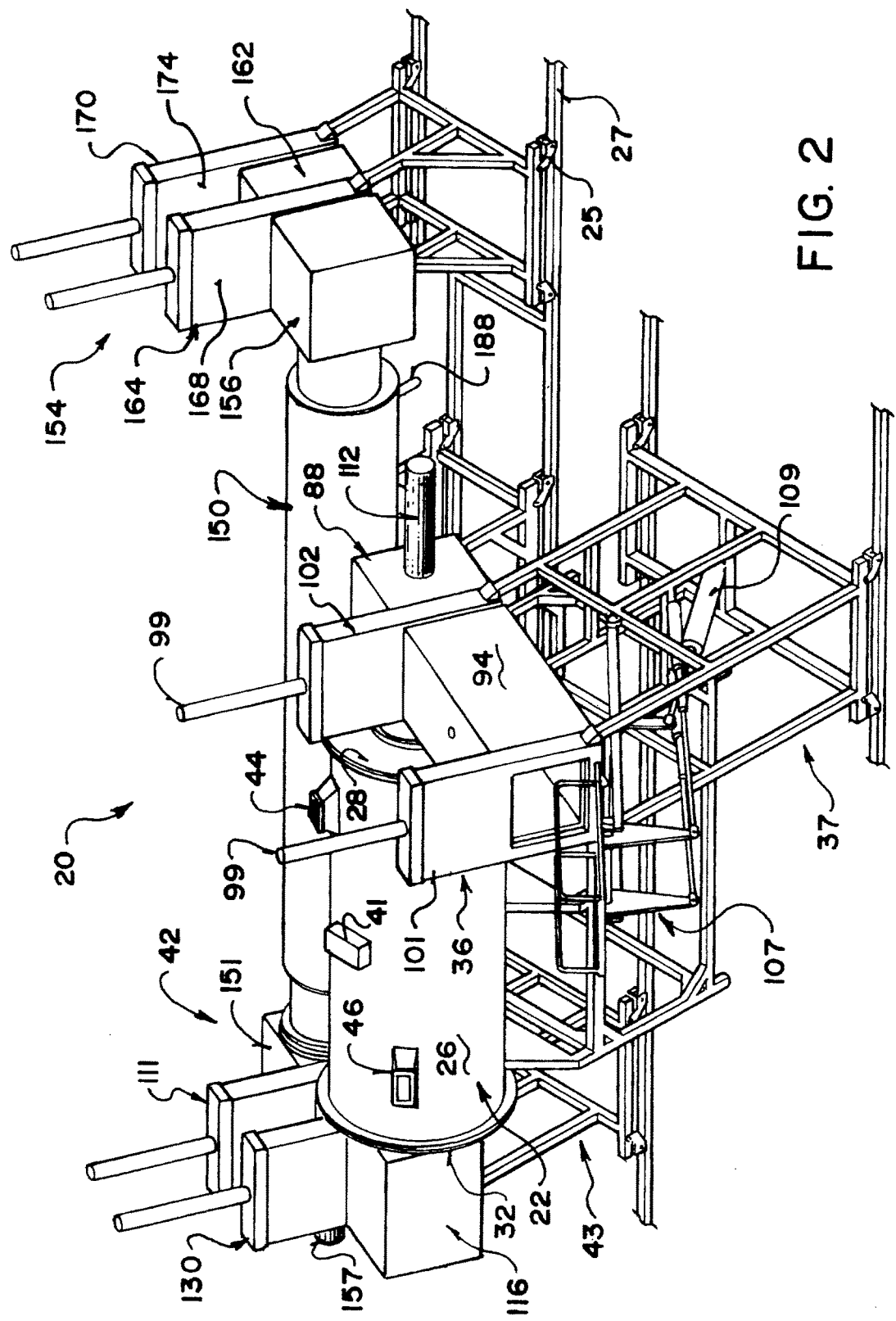
FIG. 2 is an isometric view of the apparatus from the opposite side.
Figure 3:
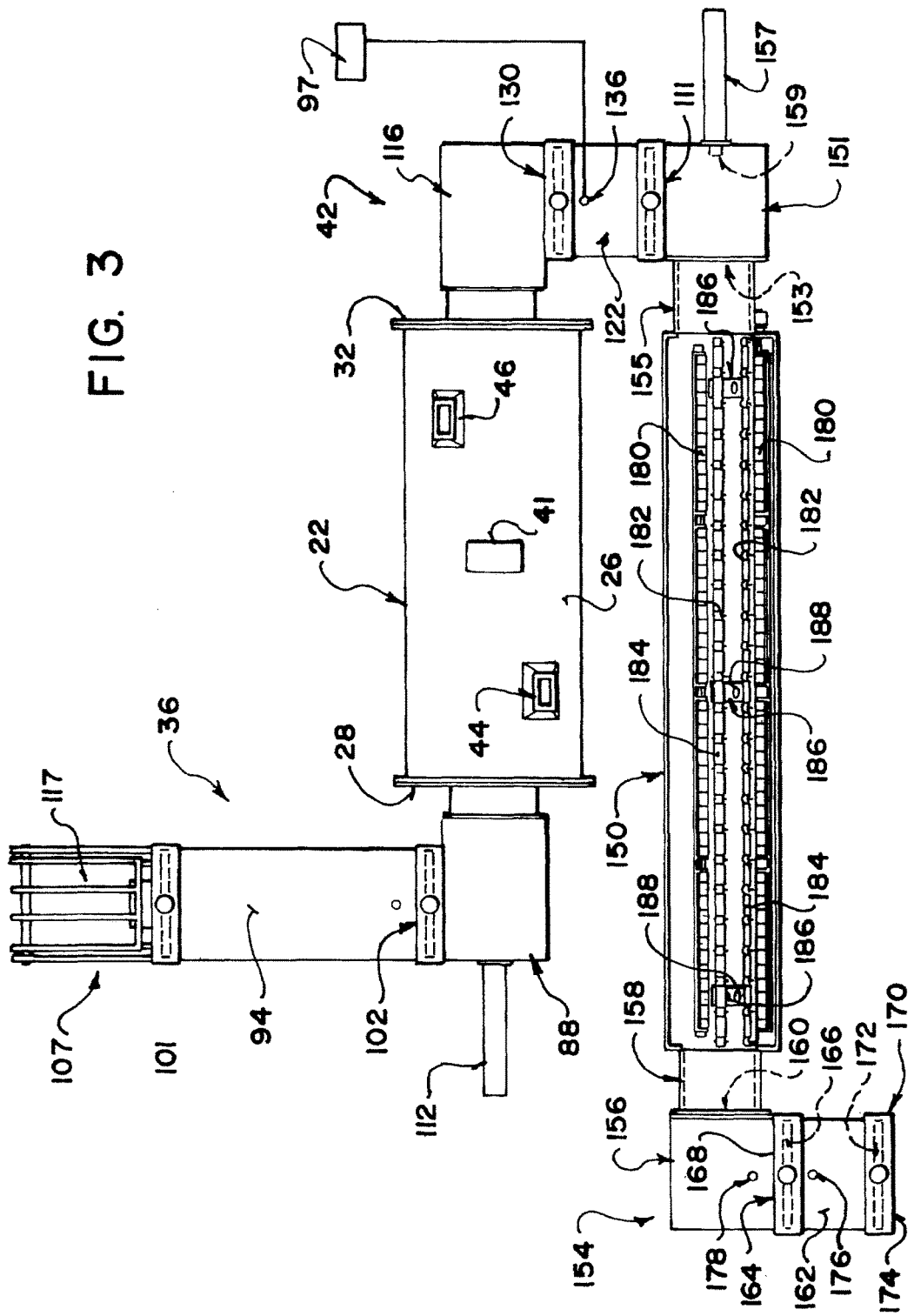
FIG. 3 is a top plan view thereof, partly in section.

In general terms, the dehydrating apparatus 20 has a vacuum chamber 22 within which an organic material in a cylindrical container 38 is dehydrated, a microwave generator 56, an equilibration chamber 150 for cooling the dehydrated material at reduced pressure, a loading module 36 to load containers into the vacuum chamber, a transfer module 42 to transfer containers from the vacuum chamber to the equilibration chamber, and an unloading module 154.

Each of the loading module 36, transfer module 42 and unloading module 154 has a pair of airlocks, respectively 101 and 102, 130 and 111, and 164 and 170. These permit the containers to be, respectively, loaded into the vacuum chamber, transferred from the vacuum chamber to the equilibration chamber, and unloaded from the equilibration chamber, while maintaining those chambers at the reduced pressures required for the dehydrating process. The structure of each of the airlocks is the same, comprising a self-sealing door movable within a housing by the piston of an air cylinder. Lifting the door opens it and allows a container to pass; lowering the door closes it and forms an airtight seal.

The dehydrating apparatus 20 has a vacuum chamber 22 supported by a stand 24. The chamber 22 has a cylindrical wall 26, an end cover 28 at the input end 30 of the chamber and an end cover 32 at the discharge end 34 of the chamber. The loading module 36 is supported on a stand 37 and connected to the end cover 28 at the input end 30 for loading containers 38 containing organic materials 40 to be dehydrated into the vacuum chamber 22. The transfer module 42 supported on a stand 43 is connected to the end cover 32 at the opposite, discharge end 34 of the vacuum chamber. The vacuum chamber 22 is oriented with its longitudinal axis approximately horizontal. The stands 37, 43 are each supported on respective wheels 25 arranged on rails 27, facilitating separation of the modules from the vacuum chamber and equilibration chamber for servicing of the apparatus.

Figure 6:
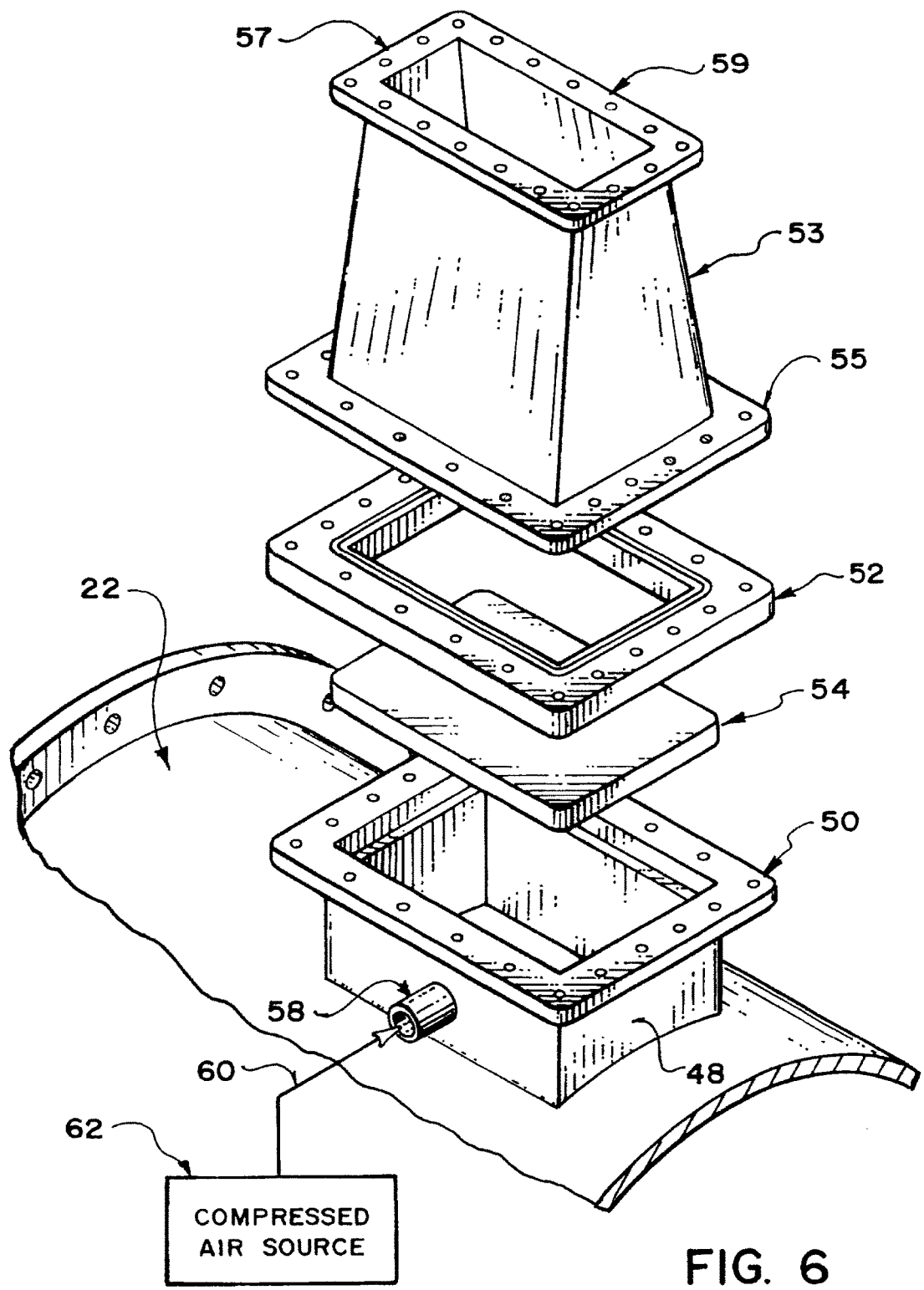
FIG. 6 is an isometric view of the microwave window assembly on the vacuum chamber.
Figure 7:
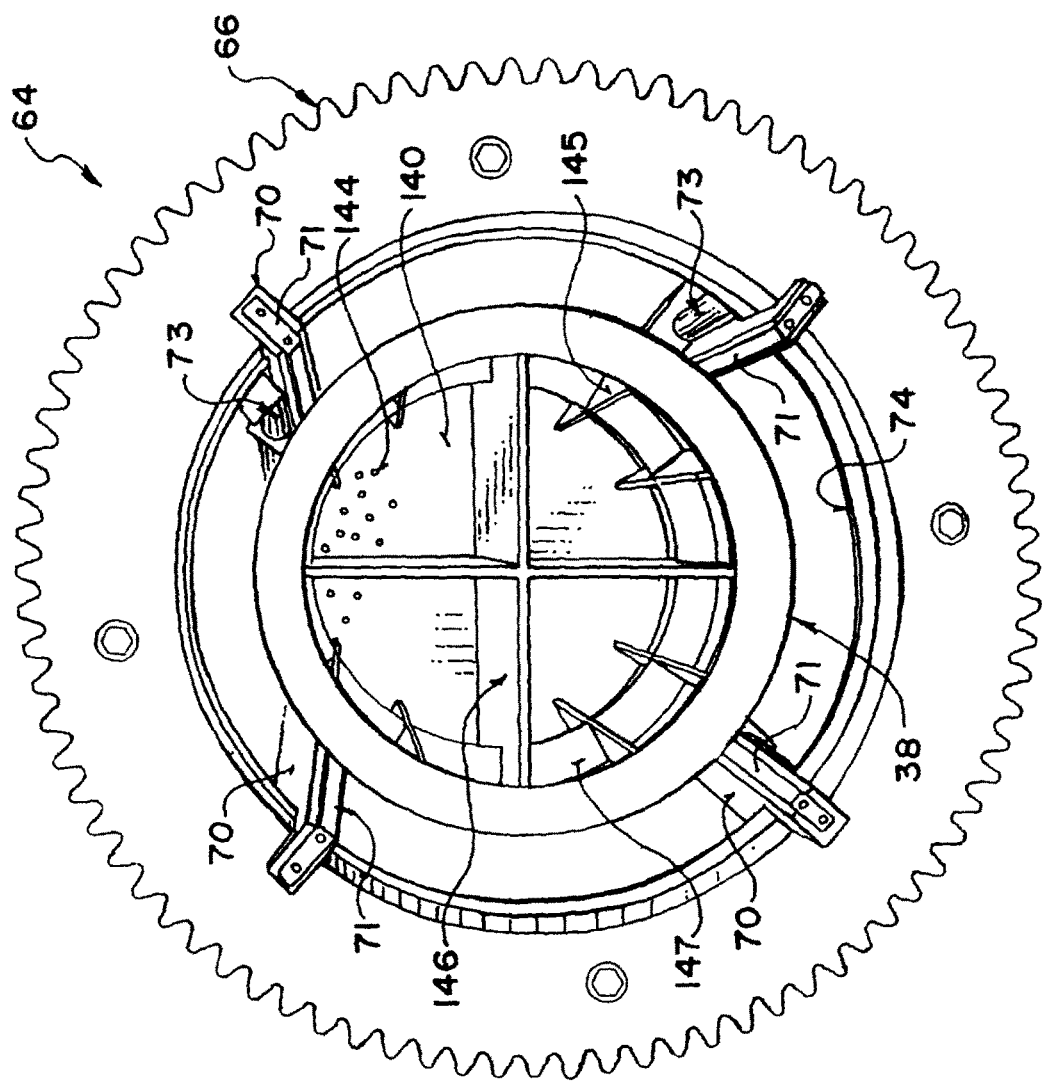
FIGS. 7 and 8 are isometric views of the rotatable cylindrical cage, containing a basket.
Figure 8:
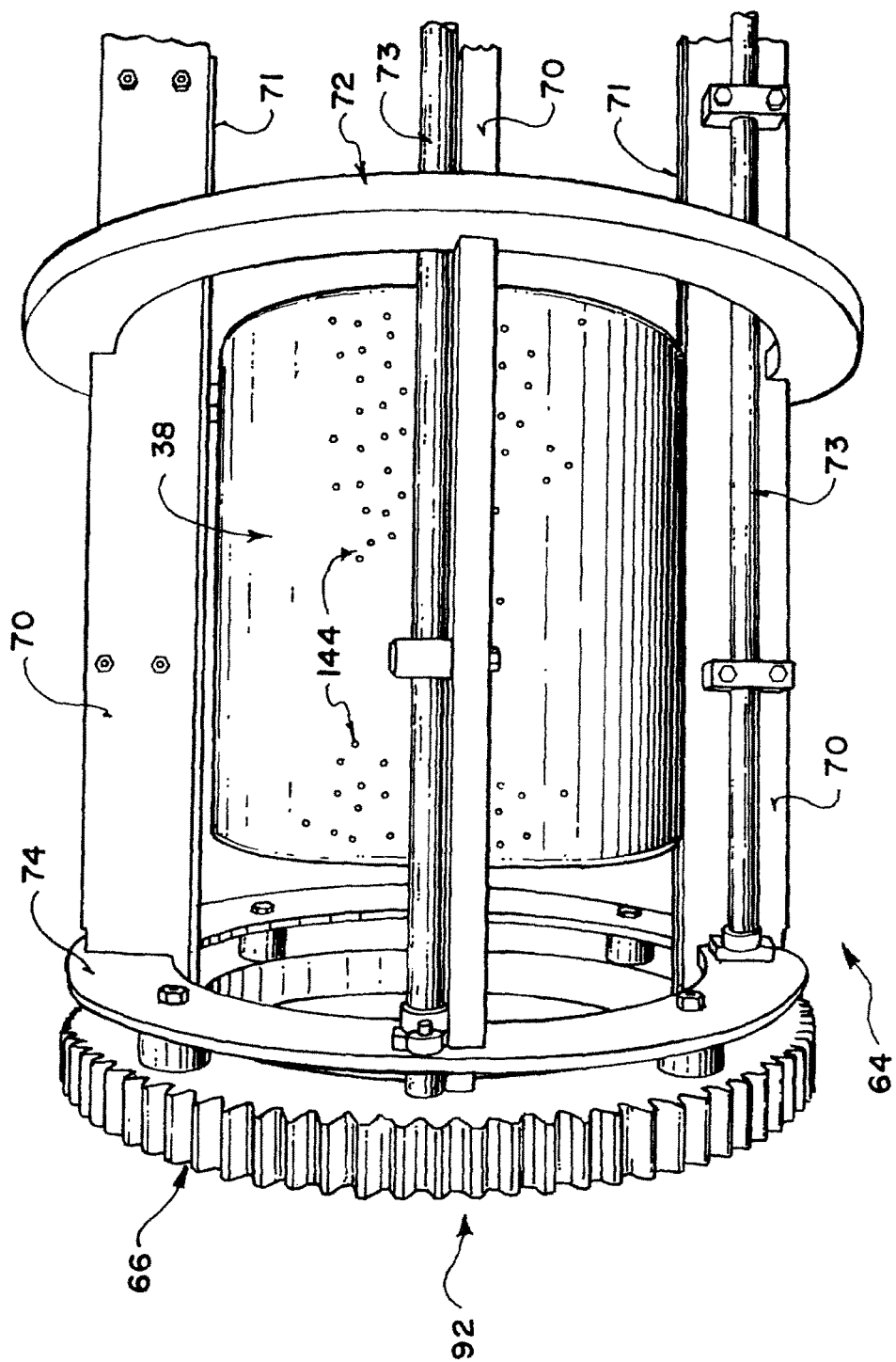
Figure 9:
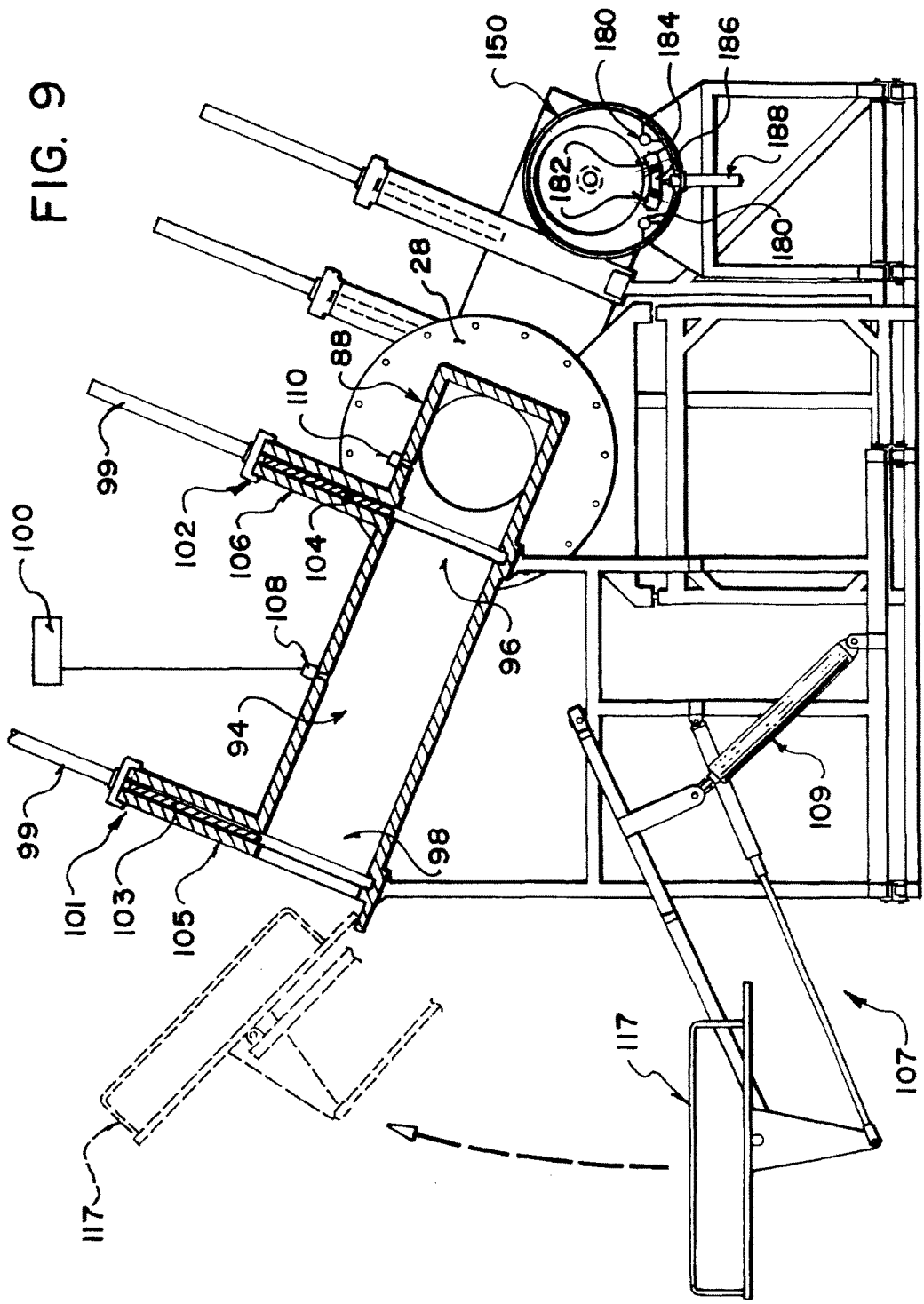
FIG. 9 is an end view of the apparatus, partly in section.

The cylindrical wall 26 of the vacuum chamber 22 has two window assemblies 44, 46 for the transmission of microwave radiation into the chamber. As best seen in FIG. 6, each window assembly has a rectangular frame 48 extending from the outside of the wall 26 with a flange 50 at the outer edge of the frame 48. A microwave-transparent window 54 is positioned in the flange. The window 54 is secured in place by a spacer 52 and a microwave input horn 53, which is attached to the window frame flange 50 by means of a flange 55 at the base of the input horn 53. The input horns 53 are operatively attached to a microwave generator 56 by waveguides (not shown). The microwave input horns 53 are rectangular in cross-section at their upper end, the rectangles having a short side 57 and a long side 59. The long sides 59 of the microwave input horns 53 of the window assemblies 44, 46 are oriented parallel to the longitudinal axis of the vacuum chamber 22.

An air inlet port 58 on each rectangular frame 48, adjacent to the windows 54, is connected by an air conduit 60 to a source of compressed air 62. By these inlet ports, air is blown across the windows 54, inside the vacuum chamber 22. Alternatively the inlet port 58 is connected to a source of another gas, for example an inert gas such as nitrogen or helium.

A rotatable cylindrical cage 64 inside the vacuum chamber is adapted to receive and rotate the containers 38. The cylindrical cage 64 is an open-sided structure. The cylindrical cage 64 has a ring gear 66, 68 at each respective longitudinal end, connected by a set of circumferentially-spaced longitudinal members 70. Circumferential support rings 72 are attached to the longitudinal members 70 at approximately one-quarter and three-quarters of the distance between the ring gears 66, 68. The cylindrical cage 64 is reinforced by steel frame rods 73 affixed to the longitudinal members 70 along their length and by steel frame rings 74 adjacent to the ring gears 66, 68 and at the longitudinal midpoint of the cylindrical cage. The cylindrical cage accommodates six containers 38 end to end. For purposes of illustration, the cylindrical cage and vacuum chamber are shown in the drawings as holding four containers only. The cylindrical cage and vacuum chamber can be made in a size to hold any selected number of containers.

Figure 4:
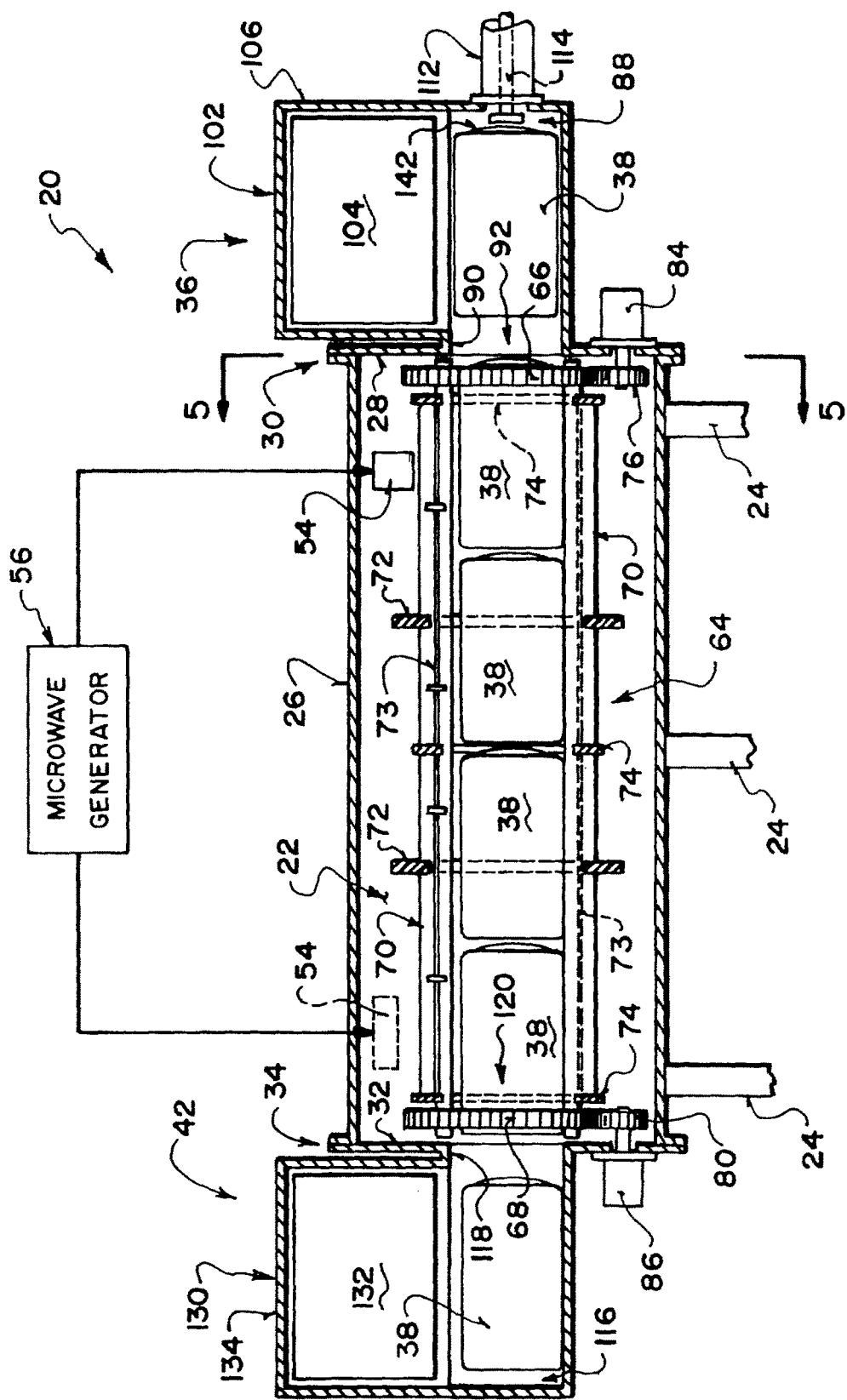
FIG. 4 is a side elevational view thereof, partly in section.
Figure 5:
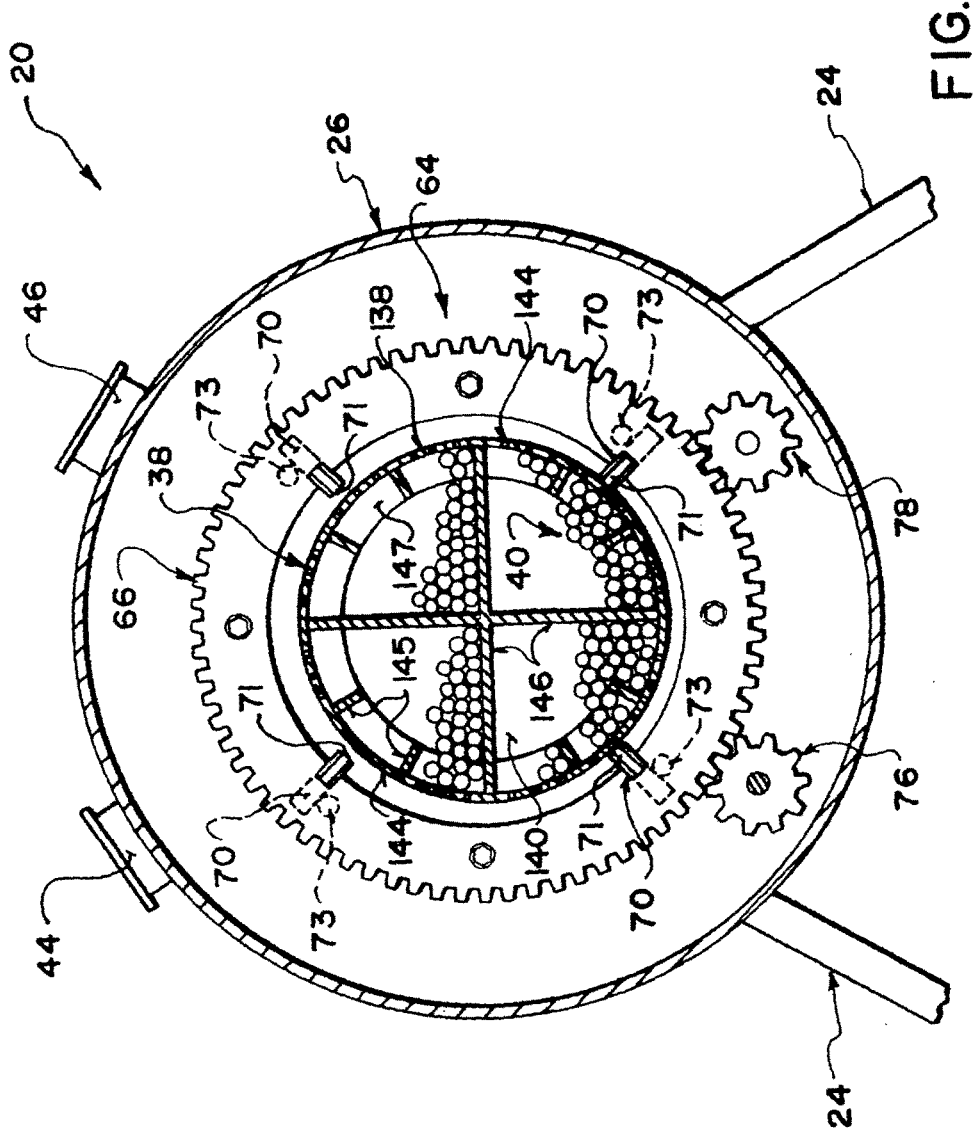
FIG. 5 is a sectional view on the line 5-5 of FIG. 4.

A pair of gears at each end of the vacuum chamber support the cylindrical cage. Two gears 76, 78 are mounted on the end cover 28 at the input end 30 of the vacuum chamber to engage the ring gear 66, and two gears (one of which is indicated by reference numeral 80 in FIG. 4) are mounted on the end cover 32 at the discharge end 34 to engage the other ring gear 68. One gear 76, 80 of each set is driven by a respective motor 84, 86, synchronized together, to rotate the cylindrical cage 64 about its longitudinal, horizontal axis, within the vacuum chamber.

The loading module 36 has a container input chamber 88 adjacent to the end cover 28 of the vacuum chamber with an opening 90 through the end cover 28 that is aligned with the open, receiving end 92 of the cylindrical cage 64, such that a container 38 in the input chamber 88 may be pushed through the opening 90 into the cylindrical cage 64. The loading module 36 has a loading channel 94 for the introduction of containers into the input chamber 88. The loading channel 94 has an inner end 96 adjacent to the input chamber 88 and an outer end 98. An airlock assembly 101 is provided at the outer end 98 of the loading channel 94. It comprises a self-sealing door 103 which is movable within a housing 105 to close the loading channel 94 with an airtight seal when in its lowered position, and to open the loading channel when in its raised position. The loading channel 94 is separated from the input chamber 88 by an airlock assembly 102. This assembly has a self-sealing door 104 which is movable within a housing 106 by a piston in an air cylinder 99 to close the loading channel 94 with an airtight seal when in its lowered position, and to open the loading channel, when in its raised position, to allow a container 38 to pass into the input chamber 88. The input module includes a container lifting assembly 107, powered by an air cylinder 109 and a tray 117. The tray is arranged to hold one or more containers and to lift the containers up to the outer end 98 of the loading channel 94. The loading channel is sloped downward, from the airlock 101 to the input chamber 88, so that a container, placed in the loading channel with its longitudinal axis oriented horizontally and parallel to the longitudinal axis of the cylindrical cage 64, can roll into the input chamber 88 under the force of gravity.

The loading channel 94 has a vacuum port 108 connected by a conduit to a vacuum system 100, for evacuating the loading channel. A vacuum port 110 is provided in the input chamber 88, connected by a conduit to the vacuum system 100, for evacuating the input chamber and the vacuum chamber. Additional vacuum ports (not shown) coupled to the vacuum system 100 are provided in the vacuum chamber 22 for the evacuation thereof, including the evacuation of the air that is blown into the vacuum chamber through the air inlet ports 58, and removal of moisture that evaporates from the organic material during dehydration. Condensers 41 are provided in the vacuum system 100 to remove moisture from it.

An air cylinder 112 with a container-pushing piston 114 is affixed to the input chamber 88. The piston 114 is movable between a position extending into the input chamber 88 and a retracted position. The piston can accordingly move containers 38 out of the input chamber 88 and through the cylindrical cage 64 and vacuum chamber 22, as discussed below.

The container transfer module 42 is provided to transfer containers of dehydrated material from the vacuum chamber to the equilibration chamber 150. The transfer module 42 has a container discharge chamber 116 affixed to the end cover 32 of the vacuum chamber 22, with an opening 118 through the end cover 32 that is aligned with the open discharge end 120 of the cylindrical cage 64, such that a container 38 in the cylindrical cage may be pushed through the opening 118 into the discharge chamber 116. The transfer module 42 has a transfer channel 122 for the removal of containers from the discharge chamber 116. The transfer channel 122 is separated from the container discharge chamber 116 by the airlock assembly 130 having a self-sealing door 132 which is movable within a housing 134 for closing to form an airtight seal, and to open the transfer channel 122, when in its raised position, to allow a container 38 to pass from the discharge chamber 116 into the transfer channel 122. The transfer module 42 has an input chamber 151 which is separated from the transfer channel 122 by the airlock assembly 111. This assembly has a self-sealing door 113 which is movable with a housing 115 to open and to seal the transfer channel 122. The transfer channel has a vacuum port 136, connected by a conduit to a vacuum system 97, for evacuation of the transfer channel. The transfer channel is sloped downward, from the discharge chamber 116 to the input chamber 151 so that a container in the discharge chamber 116 can roll into the input chamber 151 under the force of gravity.

The input chamber 151 has an opening 153 aligned with the open, receiving end 155 of the equilibration chamber 150, such that a container 38 in the input chamber 151 may be pushed through the opening 153 into the equilibration chamber. An air cylinder 157 with a container-pushing piston 159 is affixed to the input chamber 151. The piston 159 is movable between a position extending into the input chamber 151 and a retracted position. The piston can move containers 38 out of the input chamber 151 and into the equilibration chamber.

The equilibration chamber 150 serves the function of cooling the dehydrated material before the material is exposed to atmospheric pressure. This improves the appearance and texture of the product. Cooling is done by having the dehydrated product remain in the low pressure of the equilibration chamber for a sufficient dwell time to cool, for example for 15 minutes. No auxiliary cooling, e.g. by means of refrigeration, is required in the equilibration chamber. The equilibration chamber may be described as a low pressure cooling chamber.

The equilibration chamber unloading module 154 has a container discharge chamber 156 adjacent to the discharge end 158 of the equilibration chamber. The discharge chamber 156 has an opening 160 that is aligned with the open, discharge end 158 of the equilibration chamber, such that a container 38 that is moved through the equilibration chamber, as discussed below, passes through the opening 160 into the discharge chamber 156. The unloading module 154 has an unloading channel 162 for the removal of containers from the discharge chamber 156. The unloading channel 162 is separated from the discharge chamber 156 by the airlock assembly 164 having a self-sealing door 166 which is movable within a housing 168 for closing to form an airtight seal and for opening the unloading channel 162, when its raised position, to allow a container to pass from the discharge chamber 156 into the unloading channel 162. The second airlock assembly 170 is provided at the exit end of the unloading channel 162. This second airlock assembly has a self-sealing door 172 which is movable within a housing 174, to seal the unloading channel and to open to allow a container in the unloading channel to exit the unloading module 154. The unloading channel 162 is sloped downward, from the discharge chamber 156 to the second airlock assembly 170, so that a container in the discharge chamber can roll through and out of the unloading module under the force of gravity. Containers exiting the unloading module can be received onto a tray or moving belt, etc., or by an operator.

A vacuum port 176 in the unloading channel 162, connected by a conduit to the vacuum system 97, permitting the evacuation of the unloading channel. The discharge chamber 156 also has a vacuum port 178 connected by a conduit to the vacuum system 97, for evacuating the discharge chamber and the equilibration chamber. Additional vacuum ports (not shown), connected to a vacuum system 97, are provided in the equilibration chamber for the evacuation thereof, including the removal of residual moisture that evaporates from the organic material. A condenser 41 is provided to remove moisture in the vacuum system 97. The vacuum system 97 for the equilibration chamber is separate from the vacuum system 100 of the vacuum chamber, as these two chambers may be operated at different pressures.

Means are provided within the equilibration chamber for rotating the containers 38 and for moving them from the receiving end 155 to the discharge end 158. Two basket support rollers 180 extend along the length of the equilibration chamber, adjacent its lower side, for rotation about an axis parallel to the longitudinal axis of the equilibration chamber. A drive motor (not shown) is arranged for driving one of the rollers 180, providing for the rotation of the roller and accordingly of containers supported on the rollers 180 about an axis parallel to the longitudinal axis of the equilibration chamber. Two sets of roller wheels 182 are mounted on liftable longitudinal brackets 184 for rotation about an axis perpendicular to the longitudinal axis of the equilibration chamber. The brackets 184 extend along the length of the equilibration chamber, adjacent its lower side, between the support rollers 180. Three lifting brackets 186, one near each end and one at the middle of the equilibration chamber, below the longitudinal brackets 184, are arranged for vertical movement by pistons 188. Actuation of the pistons 188 raises the lifting brackets 186, which in turn raises the longitudinal brackets 184 so that the roller wheels 182 engage the containers 38 and lift them off of the support rollers 182, permitting longitudinal movement of the baskets through the equilibration chamber on the roller wheels 182, as further described below.

It will be understood that the dehydrating apparatus 20 includes computerized control systems for the operation of the airlocks, motors, pistons, microwave generator, vacuum pumps and container lifter.

The container 38 is a basket made of high density polyethylene, with a cylindrical side wall 138, a closed bottom wall 140 and a removable lid 142. The side wall, bottom wall and lid are perforated by a plurality of holes 144 for the escape of water vapor from the organic material during the dehydration process. The basket has a plurality of support ribs 147 and a support ring 145. Longitudinally-extending divider walls 146 divide the interior space into four segments, to promote the tumbling of the materials in the baskets, as the baskets rotate in the vacuum chamber.

The container may alternatively comprise a disposable sock-like sleeve fitted over a cylindrical frame, the sleeve forming the bottom wall and cylindrical side wall of the container, which has a removable lid fitted to the frame. The sleeve is perforated or made of netting. This form of container has the advantage that, when it becomes soiled, only the frame and lid need to be cleaned, the disposable sock being removed and replaced.

The Method of Dehydrating

At the beginning of a cycle of operation of the dehydrating apparatus 20, the airlocks 102, 130, 111, 164 and 170 are closed. The vacuum chamber 22 is evacuated by the vacuum system 100, i.e. the pressure is reduced to a pressure that is less than atmospheric, via the vacuum system. Absolute pressures in the vacuum chamber in the range of 20 to 100 mm of mercury are suitable for dehydrating most organic materials. The equilibration chamber 150 is evacuated by its vacuum system 97, to an absolute pressure of 30 mm of mercury or less, preferably as low as about 1 mm of mercury. The piston 114 is in its retracted position. The motors 84, 86 are actuated to rotate the cylindrical cage 64. The airlock 101 is open and the loading channel 94 is at atmospheric pressure. The microwave generator 56 is actuated, radiating microwave energy through the windows 54 into the vacuum chamber. Air (or nitrogen or helium) is blown across the windows 54, inside the vacuum chamber, through the air inlet ports 58.

A container 38 of organic material to be dehydrated is placed on the lifting assembly 107 and the air cylinder 109 is actuated to lift the container to the open end of the container loading channel 94, aligned with its longitudinal axis parallel to the longitudinal axis of the vacuum chamber. The container rolls under the force of gravity down the loading channel to rest against the airlock plate 104. The airlock 101 is closed and vacuum is applied at the vacuum port 108 to evacuate the loading channel, to the same pressure as the vacuum chamber 22.

The airlock plate 104 is then raised, permitting the container to roll, under the force of gravity, into the input chamber 88. The air cylinder 112 is actuated to move the piston 114 into the input chamber, pushing the container through the opening 90 in the end cover 28 and into the rotating cylindrical cage 64, supported by and sliding along the longitudinal members 70. The container 38 is rotated about its longitudinal axis by the rotation of the cylindrical cage 64, tumbling the material in the container as the material is being dehydrated.

To load a second container, the airlock plate 104 is lowered, sealing the loading channel 94. The vacuum in the loading channel is broken, the pressure in the loading channel returning to atmospheric. The airlock 101 is then opened. The basket-pushing piston 114 is retracted. The second container is loaded in the same manner as the first container. Once the second container is in the input chamber 88, the piston 114 pushes it into the cylindrical cage 64. This pushes the second container against the first container, displacing the first container farther down the cylindrical cage 64 towards the discharge end 34 of the vacuum chamber, by the length of one container. The process is repeated by loading additional containers in the same manner, each container displacing the previously-loaded ones in the cylindrical cage 64 by one container-length, until the cylindrical cage is full and the forward end of the first-loaded container is adjacent to the opening 118 in the end cover 32 leading to the discharge chamber 116. The loading of one more container displaces this first-loaded container into the discharge chamber 116, the length of the cylindrical cage 64 being such that it holds a whole number of containers end-to-end. Insertion of one more container thus fully displaces the first-loaded container from the cylindrical cage and vacuum chamber. This discharged container rolls under the force of gravity and comes to rest against the door 132 of the airlock assembly 130. The transfer channel 122 is evacuated to the same pressure as the vacuum chamber. The airlock door 132 is raised, allowing the discharged container to roll into the transfer channel. The airlock 130 is then closed and the pressure in the transfer channel is adjusted to equal the lower pressure in the equilibration chamber. The airlock 111 is then opened, allowing the container to roll into the input chamber 151. In order for the equilibration chamber to receive the container from the input chamber 151, the pistons 188 are actuated to raise the lifting brackets 186, the brackets 184 and the roller wheels 182. The air cylinder 157 is then actuated, causing the piston 159 to push the container into the receiving end 155 of the equilibration chamber. The container is received onto the roller wheels 182. Then the roller wheels 182 are lowered, causing the container to rest on the support rollers 180. These rollers rotate, causing the rotation of the container about its longitudinal axis at about 6 rpm. The piston 159 is retracted, the airlock 111 is closed, the pressure in the transfer channel is adjusted to equal the pressure in the vacuum chamber, and the airlock 130 is opened. A second container is then transferred from the discharge chamber 116 to the input chamber 151 in the same manner. The roller wheels 182 are then raised, lifting the container off the support rollers 180. The air cylinder 157 is actuated, pushing the container that is in the input chamber into the equilibration chamber. That container pushes against the first container, moving it farther into the equilibration chamber by one container-length. The process is repeated with additional containers until the equilibration chamber is full, holding ten containers. Insertion of one more container pushes the first-loaded container out of the discharge end 158 of the equilibration chamber and into the discharge chamber 156. The unloading channel 162 is evacuated to the same pressure as the equilibration chamber. The airlock 164 is then opened, permitting the container to roll into the unloading channel 162 and rest against the door 172 of the airlock assembly 170. The airlock 164 is then closed. The vacuum in the unloading channel 162 is then broken and the unloading channel is brought to atmospheric pressure. The airlock 170 is opened and the container of cooled, dehydrated organic material is removed from the apparatus. The airlock 170 is then closed and the unloading channel 162 is evacuated, in preparation for the unloading of the next container. The apparatus is operated on a continuous throughput basis.

Example

An apparatus according to the invention has a vacuum chamber with a length of 2.5 meters and an inner diameter of 0.96 meters. The inside diameter of the rotatable cylindrical cage is 0.50 meters. The baskets are made of polyethylene and have a length of 0.44 meters and an outer diameter of 0.44 meters. The rotatable cylindrical cage holds six baskets end-to-end. The equilibration chamber has a length of 3.6 meters and an inner diameter of 0.61 meters, and holds ten baskets end-to-end. The microwave generator has a power output of 50,000 watts. Each basket is loaded with 5 kg of partially dehydrated blueberries. The vacuum chamber is evacuated to an absolute pressure of 60 mm of mercury. The equilibration chamber is evacuated to an absolute pressure of 30 mm of mercury or less. Compressed air is blown across the inside of each of the two microwave-transparent windows at a rate of 20 liters per minute. The rotatable cylindrical cage is rotated at a speed of 6 rpm. The apparatus is operated according to the method described above. Baskets of partially dehydrated blueberries to be further dehydrated are fed continuously into the vacuum chamber. The dwell time of a given basket within the chamber is about 10 minutes and about 15 minutes within the equilibration chamber.

The blueberries that are fed into the apparatus have been pre-dried by other means to a moisture content between about 25% and 75% moisture. If some moisture is not first removed from fresh blueberries they may be too soft to agitate in the rotating basket of the apparatus without crushing. Pre-drying toughens up the blueberries and helps avoid crushing. The microwave vacuum-drying process of the invention reduces the moisture content to about 5% to 15% final moisture. The dried blueberries retain a puffed appearance and are close in volume to the fresh berries. Puffing occurs because of the expansion of steam evaporated within the berry during microwave vacuum-drying. The puffed appearance is retained after the vacuum is released and the product is removed from the apparatus.

Although the invention has been described in terms of various embodiments, it is not intended that the invention be limited to these embodiments. Various modifications within the scope of the invention will be apparent to those skilled in the art. The scope of the invention is defined by the claims that follow.

LIST OF COMPONENTS IN THE DRAWINGS 20 dehydrating apparatus
22 vacuum chamber
24 stand
25 wheels of stand
26 cylindrical wall of vacuum chamber
27 support rails
28 end cover at input end of vacuum chamber
30 input end of vacuum chamber
32 end cover at discharge end of vacuum chamber
34 discharge end of vacuum chamber
36 loading module
37 stand of loading module
38 container
40 organic material
41 condenser
42 transfer module
43 stand of unloading module
44, 46 window assemblies on vacuum chamber
48 frame of window
50 window frame flange
52 window spacer
53 microwave input horn
54 windows
55 flange on input horn
56 microwave generator
57 short side of input horn entrance
58 air inlet ports
59 long side of input horn entrance
60 air conduit
62 compressed air source
64 cylindrical cage
66, 68 ring gears
70 longitudinal members of cylindrical cage
72 cylindrical cage support rings
73 steel frame rods of cylindrical cage
74 steel frame rings of cylindrical cage
76, 78 gears at input end of vacuum chamber
80 gear at discharge end of vacuum chamber
84, 86 gear drive motors
88 container input chamber
90 opening in input end cover of vacuum chamber
92 receiving end of cylindrical cage
94 container loading channel
96 inner end of loading channel
97 vacuum system for equilibration chamber
98 outer end of loading channel
99 air cylinder
100 vacuum system for vacuum chamber
101 outer airlock assembly of loading channel
102 inner airlock assembly of loading channel
103 door of airlock 101
104 door of airlock 102
105 housing of airlock 101
106 housing of airlock 102
107 container lifting assembly
108 vacuum port in loading channel
109 air cylinder of container lifting assembly
110 vacuum port in loading channel
111 airlock assembly in transfer module
112 air cylinder of loading chamber
113 door of airlock assembly
114 piston of air cylinder 112
115 housing of airlock 111
116 discharge chamber
118 opening in end cover at discharge end of vacuum chamber
120 discharge end of cylindrical cage 64
122 transfer channel
130 airlock assembly of unloading channel
132 door of airlock 130
134 housing of airlock 130
136 vacuum port in transfer channel
138 side wall of container
140 bottom wall of container
142 lid of container
144 holes in container
145 ribs of container
146 divider walls of container
147 support ring of container
150 equilibration chamber
151 input chamber of equilibration chamber
153 opening in input chamber
154 unloading module
155 receiving end of equilibration chamber
156 discharge chamber
157 air cylinder of input chamber 158 discharge end of equilibration chamber
159 piston of air cylinder 157
160 opening in discharge chamber
162 unloading channel
164 discharge airlock assembly
166 door of airlock 164
168 housing of airlock 164
170 exit airlock assembly
172 door of airlock 170
174 housing of airlock 170
176 vacuum port in unloading channel
178 vacuum port in equilibration chamber
180 longitudinal support rollers
182 roller wheels
184 bracket for wheels
186 lifting brackets
188 pistons

What is claimed is:

1. An apparatus for dehydrating organic material, comprising:
   (a) a vacuum chamber having an input end for introduction of a container for the organic material into the vacuum chamber and a discharge end for removal of the container;
   (b) a microwave generator;
   (c) a microwave-transparent window for transmission of microwave radiation from the microwave generator into the vacuum chamber;
   (d) means for reducing pressure inside the vacuum chamber;
   (e) means for loading the container into the input end of the vacuum chamber;
   (f) means for rotating the container inside the vacuum chamber so as to tumble the organic material in the container;
   (g) means for moving the rotating container through the vacuum chamber from the input end to the discharge end thereof; and
   (h) means for unloading the container of dehydrated organic material from the vacuum chamber at the discharge end thereof.

2. An apparatus according to claim 1, further comprising means for cooling the dehydrated organic material at a pressure less than atmospheric.

3. An apparatus according to claim 2, wherein the means for cooling comprises:
   an equilibration chamber having an input end for introduction of the container of dehydrated organic material into the equilibration chamber and a discharge end for removal of the container; and
   means for reducing pressure inside the equilibration chamber.

4. An apparatus according to claim 3, wherein the apparatus further comprises:
   means for loading the container of dehydrated organic material into the input end of the equilibration chamber;
   means for rotating the container of dehydrated organic material inside the equilibration chamber;
   means for moving the container of dehydrated organic material through the equilibration chamber from the input end to the discharge end thereof; and
   means for unloading the container of dehydrated organic material from the equilibration chamber at the discharge end thereof.

5. An apparatus according to claim 4, wherein the means for rotating the container of dehydrated material inside the equilibration chamber rotates the container about a horizontal axis.

6. An apparatus according to claim 1, wherein the means for rotating the container inside the vacuum chamber rotates the container about a horizontal axis.

7. An apparatus according to claim 1, wherein the means for rotating the container inside the vacuum chamber comprises:
   a rotatable cylindrical cage having a ring gear at each respective end thereof; and
   gears at the input and discharge ends of the vacuum chamber to support and rotate the respective ring gear.

8. An apparatus according to claim 1, further comprising means for blowing a stream of gas into the vacuum chamber across the window.

9. An apparatus according to claim 1, wherein the means for moving the container through the vacuum chamber comprises a piston arranged to push the container into the vacuum chamber, and a plurality of rails for slidable support of the container through the vacuum chamber.

10. An apparatus according to claim 1, wherein the means for loading the container into the input end of the vacuum chamber comprises:
    a container input chamber which is open to the vacuum chamber at the input end of the vacuum chamber;
    a loading channel having a first end for receiving the container and a second end adjacent to the container input chamber;
    a first airlock at the first end of the loading channel and a second airlock at the second end of the loading channel; and
    a piston arranged to push the container from the container input chamber into the vacuum chamber.

11. An apparatus according to claim 10, wherein the loading channel is sloped downward from the first end to the second end thereof.

12. An apparatus according to claim 1, wherein the means for unloading the container of dehydrated organic material from the vacuum chamber at the discharge end thereof comprises:
    a discharge chamber which is open to the vacuum chamber at the discharge end of the vacuum chamber;
    an unloading channel having a first end adjacent to the discharge chamber and a second end; and
    a first airlock at the first end of the unloading channel and a second airlock at the second end of the unloading channel.

13. An apparatus according to claim 12, wherein the unloading channel is sloped downward from the first end to the second end thereof.

14. An apparatus according to claim 1, wherein the means for rotating the container comprises a rotatable cage extending from the input end to the discharge end of the vacuum chamber, the rotatable cage being configured to receive the container therein.

15. An apparatus according to claim 14, wherein the rotatable cage is cylindrical.

16. An apparatus according to claim 14, wherein the rotatable cage is configured for slidable support of the container through the rotatable cage.

17. An apparatus according to claim 14, wherein the rotatable cage is configured to hold a plurality of the containers therein abutting each other end-to-end.

18. An apparatus according to claim 14, wherein the means for moving the rotating container through the vacuum chamber comprises means to push the container into the rotatable cage and a plurality of members extending longitudinally in the rotatable cage for slidable support of the container through the rotatable cage.

19. An apparatus according to claim 14, wherein the rotatable cage has an open receiving end adjacent to the input end of the vacuum chamber and an open discharge end adjacent to the discharge end of the vacuum chamber.

20. An apparatus according to claim 14, wherein the means for rotating the container further comprises a ring gear at each respective end of the rotatable cage, and gears at the input and discharge ends of the vacuum chamber to support and rotate the respective ring gear.

21. A method for dehydrating an organic material, comprising the steps of:
(a) providing a microwave-transparent container holding the organic material to be dehydrated;
(b) introducing the container into a vacuum chamber at an input end thereof, the vacuum chamber being at a pressure less than atmospheric;
(c) rotating the container inside the vacuum chamber so as to tumble the organic material in the container;
(d) moving the rotating container through the vacuum chamber from the input end to a discharge end thereof while applying microwave radiation to the tumbling organic material to dehydrate the organic material; and
(e) removing the container of dehydrated organic material from the vacuum chamber at the discharge end.

22. A method according to claim 21, further comprising after step (e) the step of cooling the dehydrated organic material at a pressure less than atmospheric.

23. A method according to claim 22, wherein cooling the dehydrated organic material comprises the steps of:
loading the container of dehydrated organic material into the input end of an equilibration chamber, the equilibration chamber being at the pressure less than atmospheric;
rotating the container of dehydrated organic material inside the equilibration chamber;
moving the container of dehydrated organic material through the equilibration chamber from the input end to a discharge end thereof, while allowing the dehydrated organic material to cool; and
unloading the container of cooled, dehydrated organic material from the equilibration chamber at the discharge end thereof.

24. A method according to claim 23, wherein the container of dehydrated material inside the equilibration chamber is rotated about a horizontal axis.

25. A method according to claim 23, wherein the pressure in the equilibration chamber is less than the pressure in the vacuum chamber.

26. A method according to claim 21, wherein the container inside the vacuum chamber is rotated about a horizontal axis.

27. A method according to claim 21, further comprising the step of blowing a stream of gas into the vacuum chamber across a microwave-transparent window of the vacuum chamber.

28. A method according to claim 27, wherein the gas comprises air, nitrogen or helium.

29. A method according to claim 21, wherein the vacuum chamber has a rotatable cage therein, extending from the input end to the discharge end of the vacuum chamber, step (b) comprises introducing the container into the rotatable cage, step (c) comprises rotating the rotatable cage about a longitudinal axis thereof to cause rotation of the container therein, and step (d) comprises moving the rotating container through the rotatable cage from an input end of the rotatable cage to a discharge end of the rotatable cage.

30. A method for dehydrating an organic material, comprising the steps of:
(a) providing a microwave-transparent container holding the organic material to be dehydrated;
(b) introducing the container into an input end of a rotatable cage in a vacuum chamber, the rotatable cage extending from an input end of the vacuum chamber to a discharge end of the vacuum chamber, the vacuum chamber being at a pressure less than atmospheric;
(c) rotating the rotatable cage and thereby rotating the container therein so as to tumble the organic material in the container;
(d) moving the rotating container through the rotatable cage from an input end of the rotatable cage to a discharge end of the rotatable cage, while applying microwave radiation to dehydrate the organic material; and
(e) removing the container of dehydrated organic material from the vacuum chamber at the discharge end of the vacuum chamber.

31. A method for dehydrating an organic material, comprising the steps of:
(a) providing a plurality of microwave-transparent containers holding the organic material to be dehydrated;
(b) introducing the containers into an input end of a rotatable cage in a vacuum chamber, the rotatable cage extending from an input end of the vacuum chamber to a discharge end of the vacuum chamber, the containers abutting each other end-to-end in the rotatable cage, the vacuum chamber being at a pressure less than atmospheric;
(c) rotating the rotatable cage and thereby rotating the containers therein, so as to tumble the organic material in the container;
(d) moving the rotating, abutting containers through the rotatable cage from an input end of the rotatable cage to a discharge end of the rotatable cage, while applying microwave radiation to dehydrate the organic material; and
(e) removing the containers of dehydrated organic material from the vacuum chamber at the discharge end of the vacuum chamber.

32. An apparatus for dehydrating organic material, comprising:
(a) a vacuum chamber;
(b) a microwave generator;
(c) a microwave-transparent window for transmission of microwave radiation from the microwave generator into the vacuum chamber; and
(d) means for reducing arcing of microwave radiation in the vacuum chamber by blowing a stream of gas into the vacuum chamber across the window.

33. An apparatus according to claim 32, wherein the gas comprises air, nitrogen or helium.

34. An apparatus according to claim 32, further comprising a frame extending around the microwave-transparent window, and the means for blowing a stream of gas is arranged to blow the stream of gas inwardly of the frame.

35. A method of dehydrating an organic material, comprising the steps of:
(a) evacuating a vacuum chamber;
(b) transmitting microwave radiation into the vacuum chamber through a microwave-transparent window;

(c) blowing a stream of gas into the vacuum chamber across the window and thereby reduce arcing of the microwave radiation in the vacuum chamber;

(d) introducing the organic material to be dehydrated into the vacuum chamber and allowing the material to be dehydrated inside the vacuum chamber; and (e) removing the dehydrated organic material from the vacuum chamber.

36. A method according to claim 35, wherein the step of blowing creates a pressure gradient between the window and the interior of the vacuum chamber.

37. A method according to claim 35, wherein the step of blowing further prevents condensation of water on the inside of the window.

\* \* \* \* \*